(No Model.)
W. MASON.
THILL COUPLING.
No. 433,298. Patented July 29, 1890.
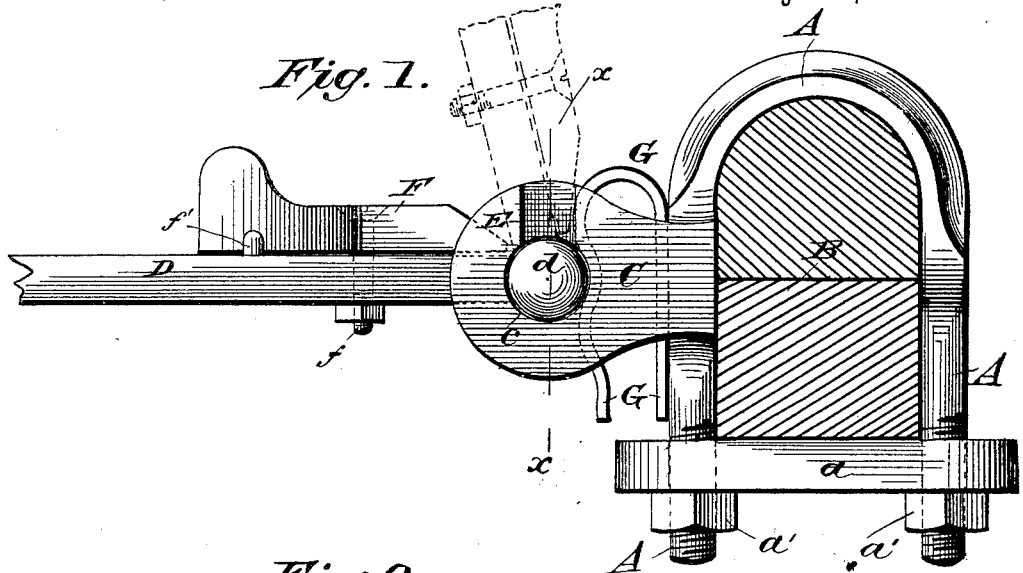
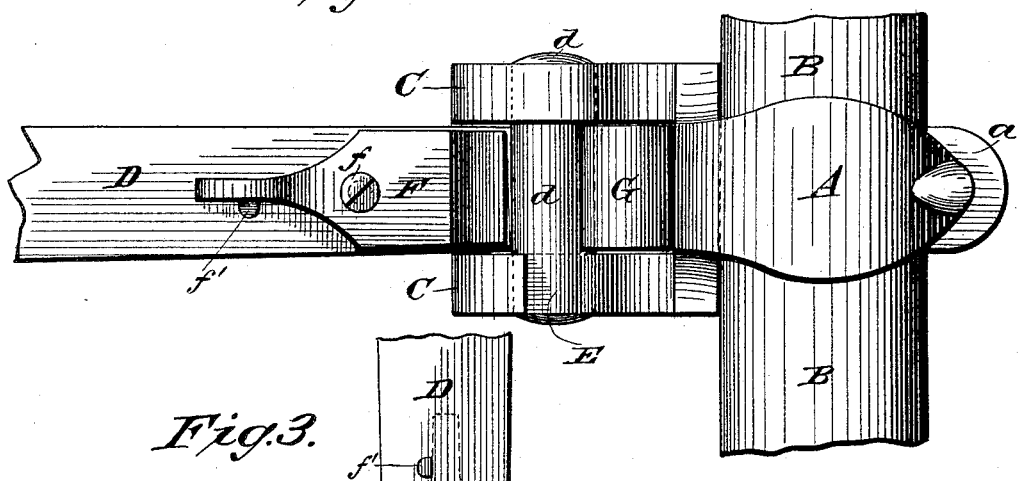
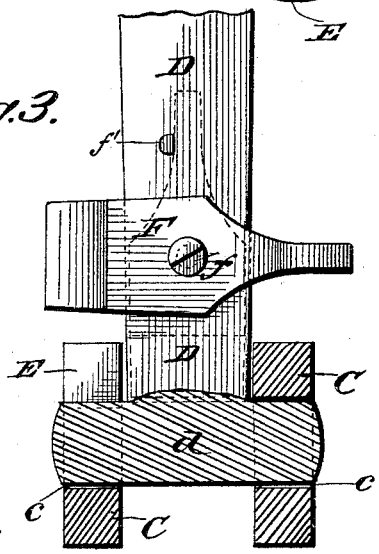
WITNESSES:
INVENTOR:
W. Mason
BY Munn & Co.
ATTORNEYS.

UNITED STATES PATENT OFFICE.

WILLIAM MASON, OF HAMILTON, VICTORIA.

THILL-COUPLING.

SPECIFICATION forming part of Letters Patent No. 433,298, dated July 29, 1890.

Application filed April 24, 1889. Renewed June 14, 1890. Serial No. 355,512. (No model.) Patented in Victoria July 20, 1888, No. 5,991; in South Australia February 12, 1889, No. 1,238; in New South Wales February 12, 1889, No. 1,235, and in Queensland February 13, 1889, No. 677.

*To all whom it may concern:*

Be it known that I, WILLIAM MASON, of Hamilton, Victoria, have invented a new and Improved Hinge-Coupling, (for which I have obtained Letters Patent in Victoria July 20, 1888, No. 5,991; in South Australia February 12, 1889, No. 1,238; in Queensland February 13, 1889, No. 677, and in New South Wales February 12, 1889, No. 1,235,) of which the following is a full, clear, and exact description.

My invention relates to a hinge-coupling which may be used to couple thills or poles to vehicles, or to hang gates or other swinging structures; and the invention has for its object to provide a simple, inexpensive, and efficient coupling of this character, which may be readily applied and cannot be uncoupled accidentally.

The invention consists in certain novel features of construction of the hinge-coupling, all as hereinafter described and claimed.

Reference is to be had to the accompanying drawings, forming a part of this specification, in which similar letters of reference indicate corresponding parts in all the figures.

Figure 1 is a side elevation of my improved hinge-coupling as applied to use for connecting thills to a vehicle-axle, the latter being in vertical section. Fig. 2 is a plan view thereof; and Fig. 3 is a detail view in vertical section on the line $x\ x$ in Fig. 1, the latch of the coupling being in unlocked position in full lines and locked position in dotted lines.

I will more particularly describe my invention as applied to use for connecting thills or poles to vehicles; but it will be understood that it is applicable as a hinge-coupling for connecting gates to their posts, and for other uses, as hereinafter more fully explained.

When used as a thill or pole connection, the main attaching plate or iron A of the coupling will be made in ordinary clip form and will have the usual washer-plate $a$ and nuts $a'\ a'$ on its threaded extremities outside of said washer to hold it to a vehicle-axle B. (Shown only in part in the drawings.) The clip A is provided with a pair of forwardly-extending lugs or ears C C, which are bored out or apertured at $c$ to receive loosely a cross-head $d$, formed on the rear end of the thill or pole plate or iron D, which will have suitable shape and size to adapt it to the rear end of a thill or pole, to which it may be secured by bolts or screws or in any other approved manner. In one of the clip-lugs C, and preferably at its upper edge, is formed a slot E, which opens into the hole or bore $c$ of the lug, but is narrower than the diameter of this hole and is a little broader or wider than the thickness of the plate D at a point near its cross-head to allow the plate to be passed through the slot edgewise when brought to register with it, as presently described.

To the face of the plate D is pivoted by a pin or bolt $f$ a latch or button F, the end of which next the head $d$ of the plate is preferably chamfered or beveled off on top, while its opposite end is narrowed and made higher to form a convenient hold for the fingers of the operator. A pin $f'$, fixed to the plate D, limits the movement of the button F when it reaches latching position.

The hinge-connection is made by raising the plate D until its flat portion next its head $d$ is in line or register with the clip-lug slot $c$, and while the latch F is in the transverse position shown in full lines in Fig. 3 of the drawings, whereupon the head $d$ of the plate D may be easily slipped into both holes $c\ c$ of the clip while the plate is being passed through the slot E, and when the plate strikes the whole or unslotted lug C of the clip and comes into line with the space between the two clip-lugs said plate D will be swung over or forward a little on its head $d$, now in the lug-holes, and until the end of the latch may be swung over through the lug-slot E and into line with the plate, as shown in full lines in Figs. 1 and 2 of the drawings, and the coupling is complete.

To uncouple the hinge-joint, the plate D, with its latch F, will be swung over until the latch end comes into line with the clip-lug slot E. The latch will then be swung open or over to the position shown in dotted lines in Fig. 3 of the drawings, whereupon the plate D will be moved a little farther in the same direction, until it comes into line with the slot E, through which it may then be withdrawn edgewise. As the thickness of the plate D and latch F together next the plate-head $d$ is greater than the width of the clip-lug slot E, it is manifest that when once coupled the hinge-connection cannot be uncoupled without first swinging the latch over to transverse position through the slot E and then shifting the plate D a little farther to pass it through the slot; hence there is no direct lateral strain from one side or the other of the thills or pole which could disconnect the coupling, which makes it most desirable and reliable as a thill or pole coupling; and when used as such I purpose slipping a bent plate-spring G between the thill-iron head $d$ and the clip A to prevent rattling of the parts by horse motion.

When I use the coupling for hinging gates or other structures, the plate A (shown here as a clip for an axle) will be made flat or otherwise formed for connection by bolts or screws to the flat or curved face of a post, while the plate D will be fastened to the gate or other swinging structure, and in any case the hinge may be easily and quickly coupled or uncoupled, but cannot be disconnected accidentally, which makes it most desirable to use, while it is comparatively inexpensive to make or apply, as will readily be understood.

Having thus described my invention, what I claim as new, and desire to secure by Letters Patent, is—

1. The combination, in a hinge-coupling, of an attaching-plate provided with a pair of bored lugs, one of them slotted inward radially to its bore, another plate having a rounded head fitting the bores of both lugs and made next its head of a thickness allowing its passage edgewise through the radial lug-slot, and a latch pivoted to the second plate and adapted to be turned through the lug-slot and to lie with its plate between the lugs of the attaching-plate, substantially as herein set forth.

2. The combination, in a hinge-coupling, of an attaching-plate, as A, provided with lugs C C, bored at $c\ c$, and one lug slotted radially at E, a plate D, having a head $d$, fitting the holes $c\ c$, said plate D next its head being of proper thickness to pass through the lug-slot E, and a latch F, pivoted to the plate D and adapted to pass through the slot E and to lie with the plate D between the lugs C C, substantially as described, for the purposes set forth.

WILLIAM MASON.

Witnesses:
P. HEARMOUTH,
I. MOYNAU.